UNITED STATES PATENT OFFICE.

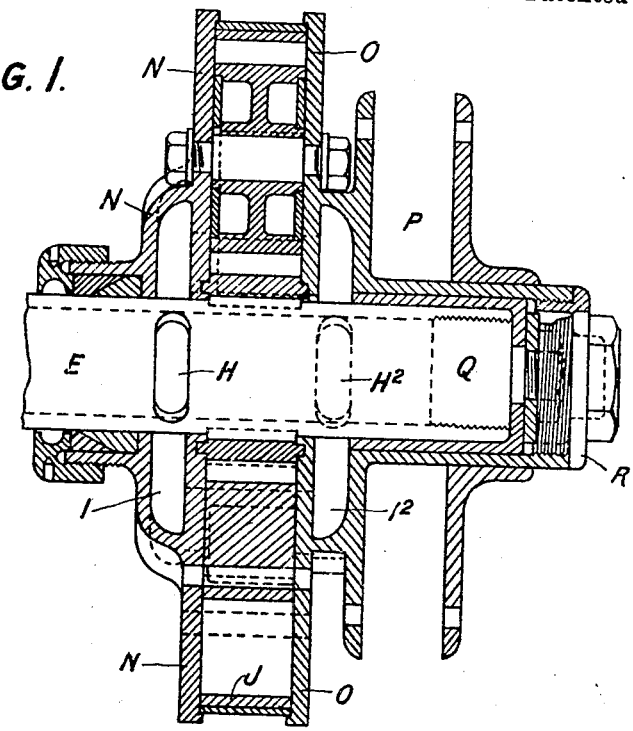
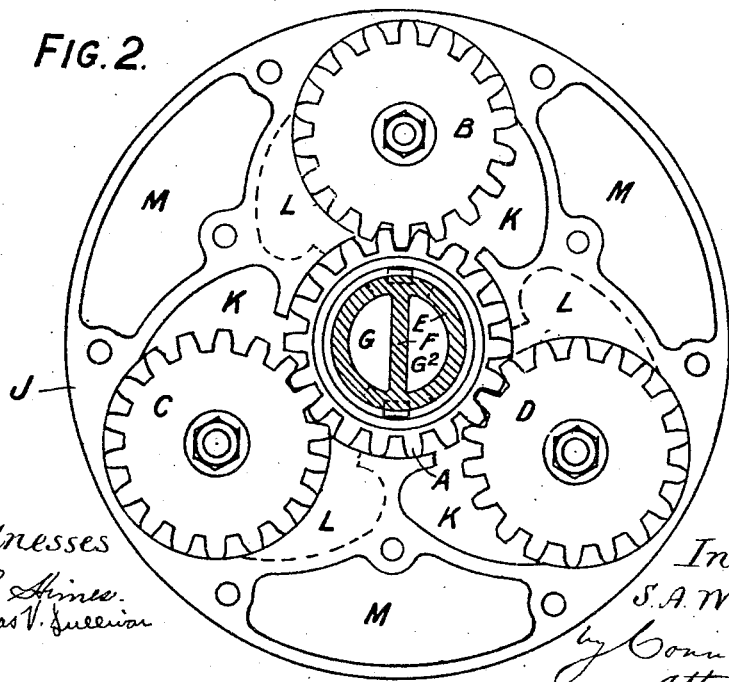

SYDNEY ASLINE WARD, OF SHEFFIELD, ENGLAND.

ROTARY HYDRAULIC MOTOR.

No. 908,365.

Specification of Letters Patent.

Patented Dec. 29, 1908.

Application filed September 28, 1908. Serial No. 455,219.

*To all whom it may concern:*

Be it known that I, SYDNEY ASLINE WARD, subject of the King of Great Britain and Ireland, residing at Broad Street Lane Works, Sheffield, county of York, England, engineer, have invented certain new and useful Improvements in Rotary Hydraulic Motors, of which the following is a specification, reference being had to the accompanying drawing.

This invention relates to a mechanical arrangement of wheels and co-acting parts by means of which and a fluid rotary motion may be imparted to the wheels of motor wagons and cars, or be utilized for other purposes in which rotary motion is required. The annexed drawings illustrate its application to the axle of a motor vehicle (for example).

Figure 1 is a sectional elevation of complete apparatus with the two-way hollow axle shown in full. Fig. 2, is an elevation of the central disk of the apparatus which incloses the driving wheels, and showing the inlet and outlet ports, also the divided or two-way hollow axle.

Briefly the mechanism consists of an arrangement known as the sun and planet wheels the sun wheel A, being fixed upon the stationary axle E, and the planet wheels B, C, D, with their teeth in gear with those of E, being capable of revolving around it and of rotating upon their own axles, and thereby carrying the casing in which they are inclosed with them round the said axle.

The axle E, is tubular and is divided longitudinally by a web F, so as to produce two conduits G, and $G^2$, each provided with a port H, and $H^2$, near the closed end at a prearranged distance one from the other, and opening into separate annular chambers I, and $I^2$, within the casing.

The three driving wheels B, C, D, (or other number if desired) are mounted upon fixed pins carried by the two outer sides of the casing, which consists of a central disk, J, with flat sides Fig. 1, having accurately bored out circular recesses to receive the several aforesaid wheels, and having also the feed ports K, and the exhaust ports L, open to a portion of the periphery of each of the wheels B, C, D, on opposite sides.

The openings M, are merely to reduce the weight of disk. The disk J, is held between two closely fitting side-plates shown in Fig. 2, in each of which is an annular chamber I, and $I^2$, which are always in communication with the ports H, and $H^2$, in the axle E, and with the feed ports K, and exhaust ports L, leading to and from the wheels.

The inner side plate N, is provided with a gland to prevent leakage, and the outside plate O, is suitably constructed to be secured to the road wheel of a car or the like, or other object to which rotary motion is to be imparted, the space P, being to receive the hub of a road wheel, or a driving pinion or the like.

Q is a plug to close the end of the shaft E, and R, is a cap or cover shown partly in section.

The operating medium is preferably oil under pressure supplied to one of the conduits in the divided axle or shaft by means of a rotary pump (for example) driven directly by the engine shaft, and such engine and pump may be of any suitable type. The flow is regulated by a controlling valve, not shown, its lever being under the control of the driver. The flow of liquid can be diverted from one of the said conduits to the other, thus changing the inlet to the exhaust and vice versa, and also reversing the action of the wheels as desired.

The starting and stopping, and controlling of the speed, is obtained by opening and closing the valve and by regulating the flow of the liquid.

It must be understood that the central wheel A, being stationary and the wheels B, C, D, gearing into it, motion can only be transmitted to the road wheel by causing the three wheels, B, C, D, to rotate upon their pins and thus to revolve with the casing round the center wheel. This motion is obtained by the oil or other medium being forced by the pump into one of the annular chambers, and into the feed ports K, connected therewith, which open upon a number of exposed teeth of each of the wheels B, C, D, the opposite side of the wheels being open to the exhaust ports L. The wheels are thus forced to rotate upon their center pins and to travel with the casing round the center wheel, the oil between the teeth being forced round to the exhaust ports L, and so through the opposite conduit in the divided axle or shaft to the pump-supply tank.

From the above description it is to be understood that the planet wheels B, C, D, are in circuit, the flow of the liquid being intercepted by the teeth in a manner somewhat similar to that of an undershot water wheel, but with the difference that one side of each wheel is held by its engagement with the teeth of the fixed wheel or circular rack upon the stationary axle. The planet wheels are caused to revolve by the pressure of the liquid upon the outside teeth and to travel round the center wheel carrying the casing and road wheel with them. The central wheel acts as a fulcrum, the load is taken by the axes of the planet wheels and the leverage being applied to the outside teeth or vanes of the planet wheels forms a lever of the second order with an increase in power of 2 to 1.

The apparatus may be attached to each separate road wheel, or to a sprocket wheel and its power transmitted by a drive chain if desired.

This simple and inexpensive form of mechanism enables me to dispense with clutches, differential wheel gear, lubricating devices, chain driving, live axles, duplicated levers, and many other parts which are likely to become loose.

I am aware of a proposed arrangement of toothed wheels consisting of a central wheel and surrounding smaller wheels for transmitting power from a liquid under pressure, such wheels being carried by a stationary casing and driving the central wheel which is fixed upon and rotates with the axle of the road wheel, but What I desire to claim is:—

A device for giving rotary motion to the road wheels of a motor vehicle, or for a like purpose, consisting of an arrangement of sun and planet wheels, the center wheel being fixed upon a stationary axle or shaft; a casing adapted to be secured to the road wheel (or the like) and free to revolve upon the said fixed axle, carrying within it a series of driving wheels gearing with the said center wheel; supply and return conduits leading the medium under pressure to and from the opposite sides of the teeth of the planet or driving wheels, combined and arranged as hereinbefore described and substantially as shown.

In witness whereof I have hereunto set my hand in presence of two witnesses.

SYDNEY ASLINE WARD.

Witnesses:
ROBERT F. DRURY,
ENSOR D. DRURY.